United States Patent [19]

Kruppa et al.

[11] 3,960,521
[45] June 1, 1976

[54] HIGH TEMPERATURE POLAR STATIONARY PHASE FOR GAS CHROMATOGRAHY

[75] Inventors: Richard F. Kruppa, State College, Pa.; Arthur Edward Coleman, Troy, N.Y.

[73] Assignees: Applied Science Laboratories, Inc., State College, Pa.; Silar Laboratories, Inc., Watervliet, N.Y.

[22] Filed: Mar. 1, 1974

[21] Appl. No.: 447,335

[52] U.S. Cl. .................................. 55/67; 55/386; 210/502; 260/448.2 B; 252/428
[51] Int. Cl.² ................................ B01D 15/08
[58] Field of Search ............ 210/198 C, 31 C, 502; 55/67, 386; 260/46.5 N, 47 CB, 448.2 R, 448.2 B, 448.2 N; 252/428, 449

[56] References Cited
UNITED STATES PATENTS

| | | | |
|---|---|---|---|
| 3,185,663 | 5/1965 | Prober | 260/448.2 N |
| 3,808,125 | 4/1974 | Good | 210/31 C |

*Primary Examiner*—John Adee
*Attorney, Agent, or Firm*—Thomas E. Sterling

[57] ABSTRACT

This invention is an improved stationary phase utilized in gas-liquid chromatograhy, having high thermal stability, producing low noise level in an electrical detecting apparatus, comprising a silicone polymer with recurring units of the formula:

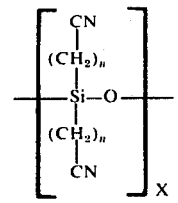

Where X is a whole number from 2 to 200 and n and n' are whole numbers from 2 to 12.

8 Claims, No Drawings

HIGH TEMPERATURE POLAR STATIONARY PHASE FOR GAS CHROMATOGRAHY

This invention relates to a stationary phase in gas-liquid chromatography and in particular to a new substance for use as a stationary phase.

Many materials have been used as the stationary phase in gas-liquid chromatography columns for the separation of methyl esters of fatty acids, monoglycerides and other compounds requiring a polar stationary phase, but all of these are either limited in thermal stability to about 200°C, or are characterized by too low a degree of polarity, to be satisfactory. Thus, a low polarity of the stationary phase limits, to a considerable extent, the degree of separation between components in a mixture being analyzed. Inadequate thermal stability results in decomposition and/or vaporization of the stationary phase and a short period of usefulness for the chromatography column. Even during this short period of use, the decomposition products of the stationary phase result in a relatively great noise level in the electrical detecting apparatus used so that recorder tracings are distorted and interpretation is difficult or impossible. A stationary phase to be useful in this type of system, must be stable and of low volatility under the relatively high operating temperature of the column, and must be selective in its retention of certain components of the mixture being analyzed. The stationary phase must also be capable of uniform distribution upon its finely divided solid support. It is with respect to an improved stationary phase that this invention relates.

It is an important object of this invention to provide a thermally stable and low volatility column packing, useful at temperatures to 275°C and consisting of a stationary phase coated on an inert support, for use in separation and analysis of complex mixtures (for example, esters of fatty acids and monoglycerides).

It is a further object of the invention to provide a gas-liquid partition column packed with a thermally stable and non-volatile stationary phase supported on an inert material.

It is also an object of the invention to provide a stationary phase which is sufficiently polar to cause separation of methyl stearate, methyl oleate, methyl linoleate, methyl linolenate, and other organic compounds.

It is also an objective to produce a stationary phase which is sufficiently high boiling and non-volatile so as not to be eluted from the column. An additional object of the invention is to provide such a stationary phase having properties such that samples dissolved therein can be eluted from it easily to obtain sharp elution peaks with good symmetry.

According to our invention, for a stationary phase we employ a silicone polymer composed of recurring units as follows:

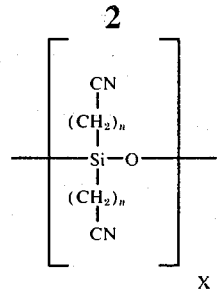

Where X is a whole number from 2 to 200 and n and n' are whole numbers from 2 to 12.

PREPARATION

A polymeric material was prepared from bis($\gamma$-cyanopropyl)dichlorosilane by adding a solution of 117.6 grams (0.5 moles) of the chlorosilane in 50 grams of toluene to a slurry of 90.3 grams (1.05 moles) of sodium bicarbonate in 175 grams of toluene. The mixture was then refluxed for four hours to remove water of condensation azeotropically. The upper toluene layer was then decanted and discarded. The polymer was then dissolved in 200 milliliters of methylene chloride and filtered to remove salts. The methylene chloride solution was then washed three times with an equal volume of distilled water. The solution was filtered through anhydrous sodium sulfate and heated under vacuum with a nitrogen purge to 150°C for one hour to remove solvent and residual water. A viscous polymeric material resulted, whose specific structure appears below:

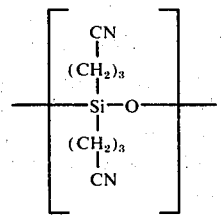

Where X is a whole number between 5 and 20. This polymer material is a di(cyanopropyl) substituted silicone.

The phase as prepared was used in a gas chromatograph in the conventional manner. The following examples demonstrate its temperature stability and separating characteristics.

EXAMPLE I

A column packing consisting of 10 percent of the di(cyanopropyl) silicone polymer deposited on 100/120 mesh GAS CHROM Q solid support (a silane treated flux calcined diatomaceous earth used specifically for gas-liquid chromatography) was prepared and packed into a 6 feet long, 4mm ID column. Operating conditions were: column temperature 180°C, inlet pressure 14 psig, flow rate 40ml per minute. The following typical analytical results were obtained with a mixture containing the compounds listed.

| Sample | Retention Time | Retention Time Relative to Methyl Stearate |
|---|---|---|
| Methyl Stearate $C_{18}$ | 7.3 | 1.00 |
| Methyl Oleate $C_{18}1=$ | 8.9 | 1.22 |
| Methyl Linoleate $C_{12}2=$ | 11.7 | 1.61 |
| Methyl Linolenate $C_{18}3=$ | 14.7 | 2.18 |
| Methyl Arachidate $C_{20}$ | 11.8 | 1.62 |

Using the same column described above, separations of cis/trans double bond fatty acid methyl esters were accomplished as follows:

| Temp | $C_{16}1$=cis $C_{16}1$=trans | $C_{18}1$=cis $C_{18}1$=trans | $C_{18}2$=cis,cis $C_{18}2$=trans,trans |
|---|---|---|---|
| 170 | 1.066 | 1.05 | 1.13 |
| 180 | | | 1.13 |
| 190 | | | 1.12 |

EXAMPLE II

A column packing consisting of 3 percent of the di(cyanopropyl) silicone polymer deposited on 100/120 mesh GAS CHROM Q was prepared and packed into a 6 feet long, 4mm ID column. Operating conditions were 240°C, inlet pressure 12 psig, flow rate 40ml/min. Typical analytical separations are listed below:

| Samples as n-butylboronates | Relative Retention Times |
|---|---|
| 1-Monoolein/1-Monostearin | 1.18 |
| 1-Monolinolein/1-Monoolein | 1.27 |

EXAMPLE III

The background current caused by bleed from this material was measured by a gas-liquid chromatography flame ionization detector. The two columns described in Examples I and II were operated at 250°C and 40ml/min flow rate of carrier gas.

| Column Containing | Background Current Measured |
|---|---|
| 3% Packing | $1.8 \times 10^{-10}$ AMPS |
| 10% Packing | $3.4 \times 10^{-10}$ AMPS |

For comparison, a typical polyester (ethyleneglycolsuccinate which is used for analysis of the components shown in Example I) exhibits at 180°C a background current of $3 \times 10^{-10}$ amps. This polyester, when exposed to a temperature of 250°C, is completely destroyed within 24 hours.

EXAMPLE IV

Gas-liquid chromatography columns prepared as described in Examples I and II were exposed to a temperature of 275°C for 16 hours. Such exposure did not produce any significant changes in the relative retention times shown in the examples. If the new stationary phase were not stable to 275°C, changes in relative retention times would have been observed.

From the above, it is apparent that we have obtained the objects of our invention and have provided a stationary phase for a gas chromatographic column packing which is thermally stable to temperatures up to 275°C, and which has a degree of polarity sufficient to separate saturated and unsaturated methyl esters of fatty acids, cis/trans fatty acid methyl ester isomers, monoglycerides, and other organic compounds. The invention has been described with reference to preferred embodiments, but it is to be understood that these are by way of illustration only. Accordingly, it is contemplated that modifications and variations can be made in the preparation of the polymer without departing from the basic idea of the invention.

Modifications can also be made in the proportion of the phase on the support and the material of the support and in the conditions of use and the substances analyzed.

We claim:

1. In the gas-liquid chromatographic separations of chemical compounds the method which comprises: passing a mixture of chemical compounds and a carrier gas through an elongated mass of supporting material maintained in the temperature range of 20°C to 275°C having thereon a stationary phase consisting of the silicone having recurring units of the formula:

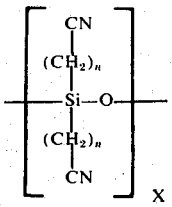

which results in a separation of the chemical compounds.

2. The method of claim 1 in which the temperature is changed between 20°C and 275°C during the separation process.

3. In the gas-liquid chromatographic separations of chemical compounds, the method which comprises a passing a mixture of chemical compounds and a carrier gas over an elongated film of a liquid stationary phase which exhibits high polarity and which is maintained in the temperature range of 20° to 275°C and which consists of recurring units of the following formula:

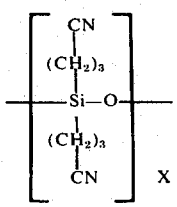

Where X is a whole number between 5 and 20.

4. A liquid stationary phase for use in preparing a column for conducting gas-liquid chromatographic separations, said liquid phase exhibiting high polarity in the temperature range of 20°C to 275°C and consisting of recurring units of the following formula:

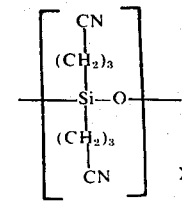

Where X is a whole number between 5 and 20.

5. A packing for use in preparing a column for conducting gas-liquid chromatographic separations, said packing exhibiting high polarity in the temperature range of 20°C to 275°C and consisting of a particulate solid support the surface of which is coated with a liquid phase having recurring units of the following formula:

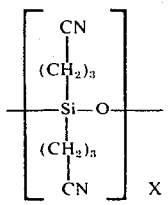

Where X is a whole number between 5 and 20.

6. A column for conducting gas-liquid chromatographic separations, said column exhibiting high polarity in the temperature range of 20°C to 275°C and filled with a packing containing a liquid phase having recurring units of the following formula:

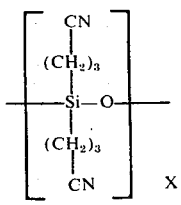

Where X is a whole number between 5 and 20.

7. A column for conducting gas-liquid chromatographic separations, said column exhibiting high polarity in the temperature range of 20°C to 275°C and having its inner wall surface covered with a film of a liquid phase consisting of recurring units of the following formula:

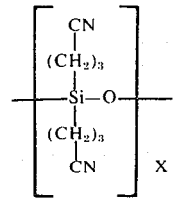

Where X is a whole number between 5 to 20.

8. A column for conducting gas-liquid chromatographic separations, said column exhibiting high polarity in the temperature range of 20°C to 275°C and having its inner wall surface covered with a film of packing, said packing containing a liquid phase having recurring units of the following formula:

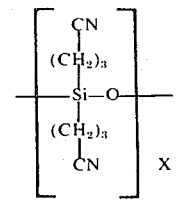

Where x is a whole number between 5 and 20.

* * * * *